April 1, 1947.  E. W. CARR ET AL  2,418,396
WHEEL LOCKING MEANS

Filed March 3, 1945

Inventors:
Edward W. Carr, &
Robert H. Peterson.
By Joseph O. Lange
Atty.

Patented Apr. 1, 1947

2,418,396

UNITED STATES PATENT OFFICE 2,418,396

WHEEL LOCKING MEANS

Edward W. Carr and Robert H. Peterson, Chicago, Ill., assignors to Crane Co., Chicago, Ill., a corporation of Illinois Application March 3, 1945, Serial No. 580,900

10 Claims. (Cl. 287—53)

This invention relates broadly to valve actuating mechanisms. More particularly, it pertains to a novel wheel locking means for valve chainwheels or the like, such as the general type shown and described, for example, on page 176, Catalog No. 41, published by Crane Co. It has long been a serious problem in the many fields of installation to provide satisfactory locking means for chainwheels and one of the principal obstacles faced has been the provision of a convenient assembly and locking of chainwheels or the like by the user and thus be freely capable of application to valves already in service. It should be understood that serious hazards are involved either through a failure of a valve to operate properly or for the chainwheel to become accidentally disconnected and thus cause personal injuries and damage to property.

Broadly, the true worth of our invention may be reflected in its solving a problem whereby a construction can now be used which can be securely and readily assembled by the user without requiring special tools or unusual effort.

A further object of this invention is to provide a construction in which the chainwheel locking assembly or the like is relatively simple and in which the manufacture thereof is economical.

Another important object is to provide a positive mechanical locking medium which is relatively easily disassembled when required, but which, while permitting initial looseness, prevents further objectionable loosening of the chainwheel as normally induced by vibration and the rotary action of the conventional chainwheel guide when sliding on the locking plugs.

At the outset, in order to obtain a better and more complete appreciation of the problem encountered and the background for this invention, it should be understood generally that in operating valves by means of a chainwheel or the like such valves are of necessity frequently located at a considerable distance above the operator. Therefore, if a chainwheel should become unlocked and thereby accidentally released from its original fixed connection or attachment to the valve stem or to the yoke sleeve as hereinafter described in detail, it may fall a substantial distance with the usual result of injury to the operator and frequently to the equipment below. Briefly, it is the prime object of this invention to alleviate such hazards as just referred to.

Figure 1:
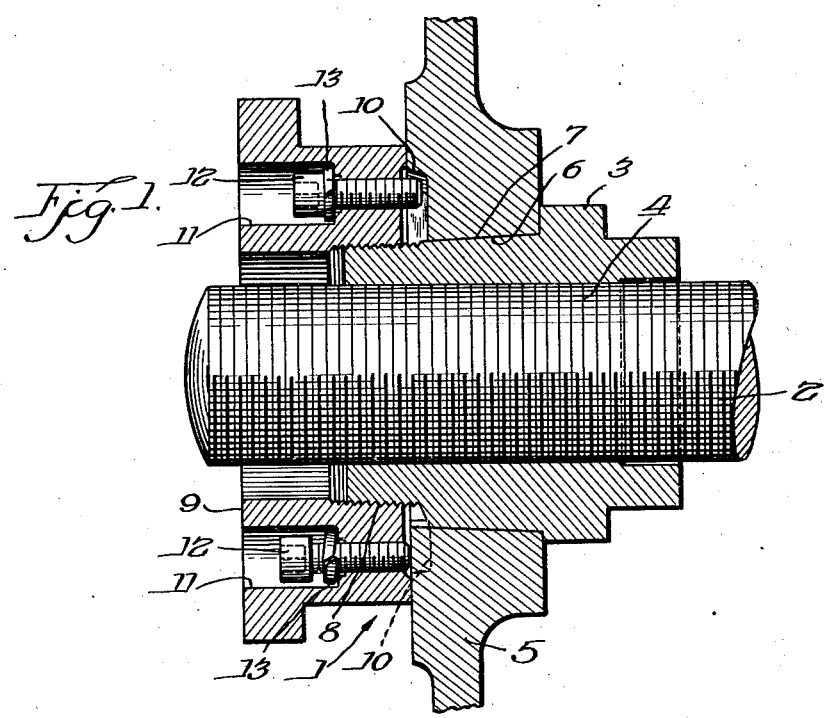

Further objects and advantages will become more readily apparent upon proceeding with the specification read in light of the accompanying drawing, in which Fig. 1 is a fragmentary sectional view of a valve chainwheel construction embodying our invention.

Figure 2:
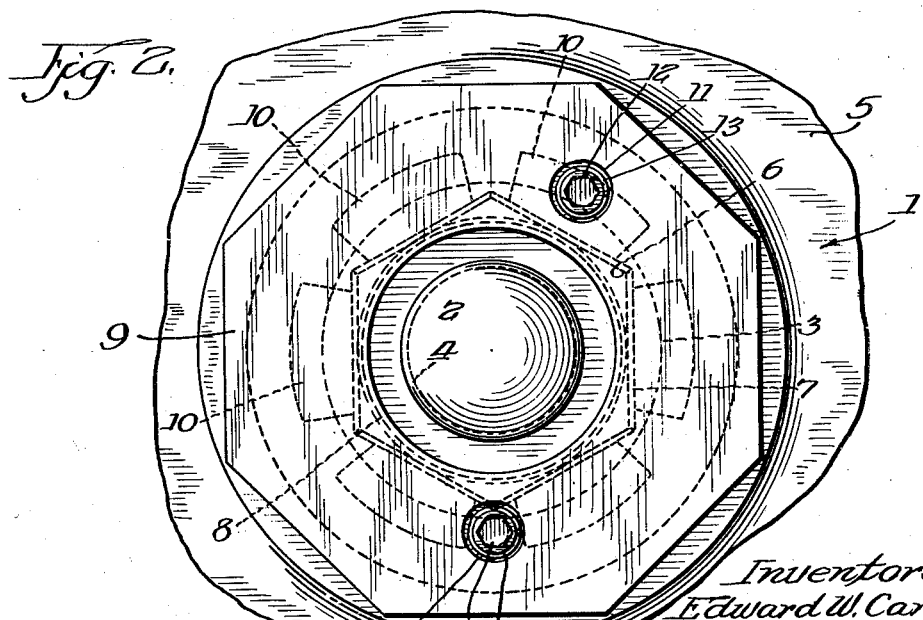

Fig. 2 is a planned view of the construction shown in Fig. 1.

Similar reference characters refer to similar parts throughout the several views.

Referring now to Fig. 1, the rotatable chainwheel, generally designated 1, is shown in fragmentary section because of space limitations and is attached to the upper end of the valve stem 2 by means of a threaded yoke sleeve 3 journaled on the threaded stem as indicated at 4. A chainwheel hub 5 is provided with the polygonally shaped recess 6 snugly fitting over a similarly formed shank 7 of the yoke sleeve 3, the latter member being rotatably mounted within a yoke, not shown, to raise and to lower a valve closure member, also not shown. The upper face of the chainwheel hub 5 is provided with the several recesses 10 annularly arranged and preferably spaced apart as indicated. The upper portion of the yoke sleeve 3 is threaded at 8 to receive the chainwheel nut 9. The latter member has the annularly positioned counterbored recesses 11 predeterminately spaced apart for the purpose of receiving the set screws 12, the latter preferably being fitted with the lock washers 13.

With the foregoing construction now in mind, it will be apparent that at least one of the set screws 12 can be moved on its thread inwardly to project but not necessarily be grounded within the recess 10 as shown more clearly in the upper half portion of Fig. 1. The other set screw may bear against the raised land between the recesses 10 or it too, depending upon the spacing employed, may project within the recess 10. It is of course clear that the screw which projects into the recess 10 serves to lock the nut 9 against substantial or unlimited rotational movement. Even conceding that there might be slight rotational movement permitted because of transverse arcuate movements of the set screw 12 within the arcuately extending recess 10, the end limits of the recess in either direction of chainwheel rotation will provide an abutment surface against which the set screw 12 strikes to prevent the locknut 9 from rotating completely around on its thread and thereby becoming detached or unscrewed entirely. In other words, the slight rotational movement of the locknut 9 relative to the chainwheel hub 5 does not permit disengagement of the thread 8 from the member 9 since the length of each recess 10 constitutes only a small percentage of the actual thread length itself.

It should thus be apparent from the construction described that the arrangement is desirable because with the locknut shouldered, as indicated, at least one of the set screws 12 will at all times engage one of the recessed panels 10, the latter panels and the set screws being spaced to provide for the latter arrangement. As previously stated, in some cases both set screws 12 may enter the recessed panels 10 but for purposes of our invention, the entry of only one is sufficient to accomplish the purpose.

In assembling the nut 9 with the threads of the yoke sleeve 3, the nut will normally be pulled up tight. However, if relative rotational movement between the chainwheel and the locknut subsequently occurs due to loosening of the latter member on its threads, any further tendencies in the latter direction will be inhibited by one or both of the set screws abutting against the end surfaces marking the limits of the recesses 10 of the chainwheel hub 5 and this applies regardless of the direction of rotation of the chainwheel. Further loosening of the thread 8 is prevented which looseness might normally be induced by vibration and the rotary action of the chainwheel guide sliding on the locking plug. It should be further apparent that a novel mechanical locking means for a device of this kind has been provided and greater economy is effected by the elimination of the extra locking nut heretofore employed. It should also be evident that the chainwheel may be mounted directly upon suitable polygonal portions of the stem 2 without necessitating the use of the interposed yoke sleeve 3.

It is recognized that the particular form of construction adopted may vary substantially from that illustrated and described. It is the desire therefore not to be limited to the precise construction, arrangement and operation of parts as hereinabove shown and described, since it is manifest that several variations or modifications in the detail structure and arrangement may be employed, without departing from the spirit and scope of our invention. Reservation of the right is therefore made to all such variations and modifications as properly fall within the scope of our improvements and terms of the following claims.

We claim:

1. In locking means for a chainwheel or the like, the combination including a chainwheel, a yoke sleeve non-rotatably mounted relative to the said chainwheel, a wheel nut having projecting portions, the chainwheel having recessed portions on its face engageable by the said projecting portions selectively positioned on the said wheel nut.

2. In a chainwheel lock construction, a chainwheel, a yoke sleeve in non-rotatable relation to the said wheel, a wheel nut engaging the said yoke sleeve, the said wheel nut having projections, the hub of the chainwheel having recessed portions between abutting surfaces of the said wheel nut and the said chainwheel, the recessed portions being engageable by the said projections on the said wheel nut.

3. The combination of a chainwheel locking construction, a chainwheel with recessed portions, a stem actuated by the said chainwheel, a wheel nut having means for retaining the chainwheel on the said stem, the said wheel nut having projecting means for engagement with the recessed portions on the said chainwheel.

4. The combination of a chainwheel locking means including a chainwheel having recessed portions, a yoke sleeve, a stem supporting the said chainwheel in non-rotatable relation therewith, a threaded wheel nut engaging said yoke sleeve for retaining the chainwheel on the said stem, the wheel nut having removable projecting means for engagement with the recessed portions on the said chainwheel, whereby limited rotational movement between the said wheel nut and stem is permitted in either direction in the event that the said nut is accidentally loosened.

5. In a chainwheel construction, the combination including a chainwheel, a yoke sleeve mounted in non-rotatable relation to the said chainwheel, a wheel nut having a plurality of projecting portions, the chainwheel having arcuately extending spaced apart recessed portions on its face portion adjacent the wheel nut, whereby the recessed portions are engageable by at least one of said projecting portions extending from a lower surface of the said wheel nut.

6. In a chainwheel lock construction, the combination including a chainwheel, a yoke sleeve in non-rotatable relation to the said chainwheel, a wheel nut with projecting members, the chainwheel having spaced apart recesses on an upper face portion engageable by said projecting members selectively positioned on the said wheel nut, the said projecting members including screw means, at least one of the latter having a free end portion extending into the spaces defined by the chainwheel recesses.

7. The combination of a chainwheel lock construction or the like including a chainwheel, a stem actuated by the said chainwheel, a wheel nut having thread means for locking the said chainwheel on the stem, recesses on the said chainwheel, screw means shouldered within the said wheel nut for engagement with transverse surface portions of the chainwheel recesses.

8. A chainwheel lock construction including a chainwheel having upper surface recessed portions, a stem actuated by the said chainwheel, a yoke sleeve, a threaded wheel nut mounted on the yoke sleeve for retaining the said chainwheel in fixed position relative to the said stem, threaded projecting portions on the said wheel nut for engagement with end limits of the recessed portions on the chainwheel in the event that the said threaded wheel nut becomes loosened thereby permitting limited rotational movement of the wheel nut on its threads.

9. The combination of a chainwheel lock construction including a chainwheel having annularly arranged recesses, a stem actuated by the said chainwheel, a wheel nut for holding the said chainwheel fixedly relative to the stem, the said wheel nut having projecting screws, at least one of which is engageable with the recesses of the chainwheel whereby relative rotational movement between the said nut and stem is held to predetermined limits.

10. A chainwheel lock construction, the combination including a chainwheel, a yoke sleeve, a wheel nut threadedly mounted on the said yoke sleeve, the said wheel nut having projecting portions, the chainwheel having annular recesses on its face engageable by said projecting portions on the said wheel nut, the limit of rotational movement of the said wheel nut on the said yoke sleeve being defined by the length of the said recesses.

EDWARD W. CARR.
ROBERT H. PETERSON.

REFERENCES CITED

The following references are of record in the file of this patent:

UNITED STATES PATENTS

| Number | Name | Date |
|---|---|---|
| 958,955 | Cullman | May 24, 1910 |
| 1,638,300 | Gagnon | Aug. 9, 1927 |
| 940,352 | Nichols | Nov. 16, 1909 |